United States Patent
Zalyaliev et al.

[15] 3,693,934
[45] Sept. 26, 1972

[54] VALVE MECHANISM

[72] Inventors: Mansur Abdullovich Zalyaliev, ulitsa Shevchenko, 53, kv. 43; Khalim Akhmetovich Asfandiyarov, ulitsa Tukaeva, 73a, kv. 48; Yakov Fedorovich Gubarev, ulitsa Gogolya, 51, kv. 8; Filipp Grigorievich Arzamastsev, ulitsa Shevchenko, 55, kv. 48, all of Bugulma Tatarskoi ASSR, U.S.S.R.

[22] Filed: May 1, 1970

[21] Appl. No.: 33,740

[52] U.S. Cl. ............251/149.5, 251/149.9, 65/300
[51] Int. Cl. ............................................F16l 29/00
[58] Field of Search.....251/149, 149.1, 149.4, 149.5, 251/149.6, 149.8, 149.9; 137/322; 65/59, 300

[56] References Cited

UNITED STATES PATENTS

| | | | |
|---|---|---|---|
| 2,804,317 | 8/1957 | Prater | 251/149.4 X |
| 3,339,883 | 9/1967 | Drake | 251/149.4 |
| 3,272,612 | 9/1966 | Hamilton | 65/300 X |

FOREIGN PATENTS OR APPLICATIONS

| | | | |
|---|---|---|---|
| 425,141 | 3/1935 | Great Britain | 251/149.8 |
| 749,406 | 5/1956 | Great Britain | 251/149.5 |

*Primary Examiner*—William R. Cline
*Attorney*—Waters, Roditi, Schwartz & Nissen

[57] ABSTRACT

A valve mechanism for supplying pressurized gas into a pipe and controlling pressure therein in the process of vitrification thereof, used preferably at oil extraction, comprising a pipe branch being connected to a hose for supplying pressurized gas, the pipe branch having a member for a connection to the pipe; a spring loaded cap seated on the pipe branch, the cap sealing the joint of the pipe branch to the pipe, and a valve shutting off the discharge of the pressurized gas from the device when disconnecting from the pipe as well as a pivot mechanism arranged between the pipe branch and the hose, the pivot mechanism preventing the twisting of the hose.

3 Claims, 2 Drawing Figures

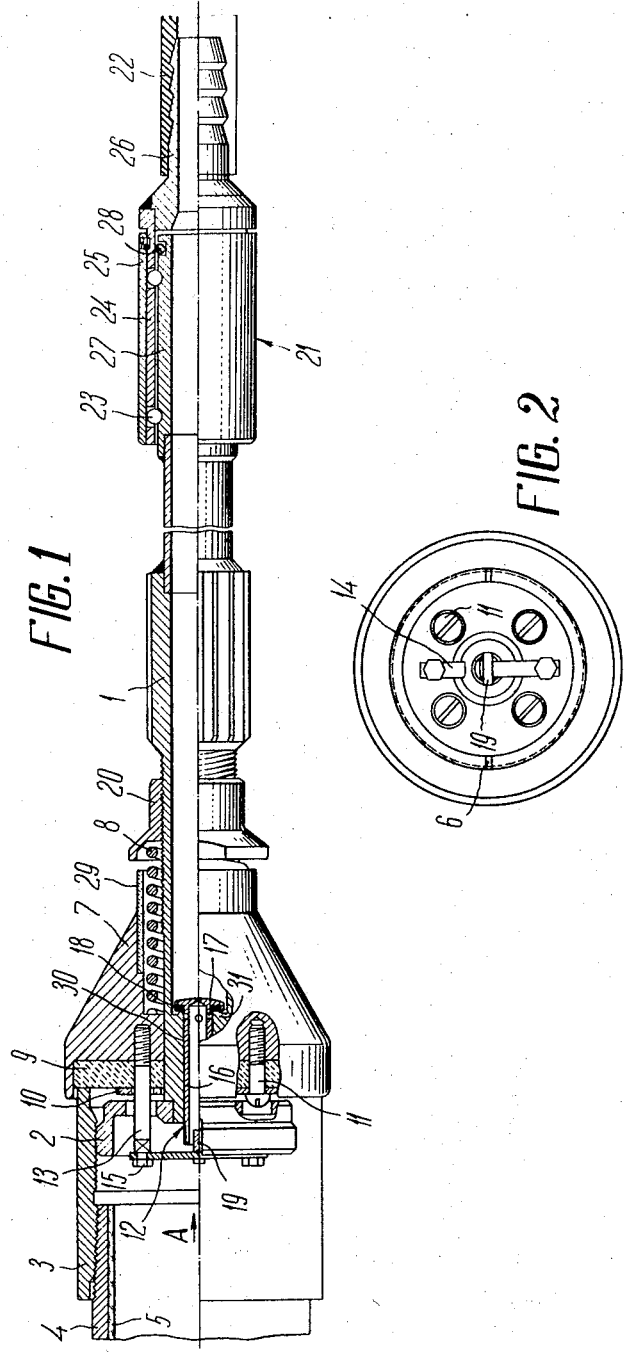

VALVE MECHANISM

The present invention relates to the sphere of manufacture of vitrified pipes and, more particularly, to devices used for supplying a pressurized gas into pipes during the process of vitrification thereof, and is used preferably for oil extraction.

Known in the art is a device for supplying a pressurized gas into a pipe during the process of vitrification thereof, comprising a pipe branch connected to a source of the pressurized gas and provided with a member to be connected with the pipe, a screw cap seated onto said pipe branch and hermetically sealing the connection of the pipe branch with the pipe, and a valve mechanism used to discontinue the supply of the pressurized gas from the device when the latter is disconnected from the pipe (cf. U.S.S.R. Inventor's Certificate No. 169,274).

The connecting member of the conventional device is essentially a collar secured on the pipe branch and pivotaly connected with rods. The pipe branch is connected with a hose in which an excessive pressure under the conditions required for the vitrification of pipes is constantly maintained. The pipe branch end portion facing the pipe space is provided with ducts arranged in a fan-like manner and overlapped by a spring-loaded screw cap in case the pipe branch is disconnected from the pipe.

However, the prior art device does not provide for a reliable operation under the conditions of the known technology for the vitrification of pipes, whereby a pipe being vitrified is moved along a roller table in the longitudinal direction and is rotated simultaneously with the device, as the connecting member protruding above the pipe and the coupling thrusts against the guiding rollers of the roller table and draws the connecting member off the pipe in the course of the displacement of the latter, and, consequently, disturbs the hermetic sealing of the pipe connection with the device.

The present invention has as its object the provision of such a connecting member that will ensure hermetic sealing of the connection of the device with the pipe during their longitudinal displacement and rotation of the course of the pipe vitrification.

An object of the present invention is to provide a valve mechanism which ensures a hermetic joint of the device with a pipe being adapted for the quick connection and disconnection thereof, and including a hermetic shut-off for the valve passage of the mechanism when disconnecting it from the pipe. Another object of the present invention is to provide an automatic control which will ensure the presence of a required pressure in the pipe. Another object of the present invention is to provide structure for rotating a pipe when reciprocating during the process of its vitrification. These and other objects of the present invention are readily attained by including in the valve mechanism a member for coupling the mechanism to the pipe, a branch pipe, a spring-loaded cap seated onto the branch pipe so as to permit it axial motion, a valve for shutting off the passage of the valve mechanism when disconnecting it from the pipe being vitrified the latter of which, through intermediate members, is rigidly connected to the cap which has on the end face thereof a sealing ring providing a hermetic seal between the pipe being vitrified and the valve mechanism. According to the present invention, a member for connecting the valve mechanism with the pipe being vitrified consists of a sleeve having an external thread corresponding to the thread of the pipe being vitrified and is rigidly connected to the branch pipe; automatic control of the necessary pressure in the pipe being vitrified is accomplished in that an outside surface of the branch pipe has a thread whereon a nut is screwed, and interacts with a spring which in turn acts upon said cap, and thereby controls the force of applying the cap to the pipe being vitrified. It is advantageous for the rotation of the pipe, when reciprocating during the process of vitrification, that the end of the branch pipe which is connected to the pressurized gas source, be provided with a swivel mechanism. It is also advantageous, in order to prevent the tacking of the sleeve of the cooled coupling of the pipe being vitrified, that the sleeve be provided with a slot.

As a result of the present invention, there is provided a device which is extremely reliable in operation.

The following description of exemplary embodiments of the present invention is given with reference to the accompanying drawings, in which:

FIG. 1 shows a longitudinal view, particularly in section of a device for supplying a pressurized gas into a pipe during the process of vitrification thereof, according to the invention and FIG. 2 is an end view taken along arrow A in FIG. 1.

The device comprises a branch pipe 1 (FIG. 1) one of whose end portions has a connecting member secured thereon and which is fashioned as a coupling 2 having an outer threaded portion. This thread is complementary to the inner thread of a clutch 3 screwed onto a pipe 4 having a glass tube 5 inserted thereinto. The butt ends of the coupling 2 are provided with temperature slots 6 (FIG. 2) preventing the coupling from being gripped by the pipe clutch upon being cooled.

In order to hermetically seal the connection of the device with the pipe 4 (FIG. 1), the branch pipe has seated therein a translationally movable screw cap 7 and a spring 8 pressing the screw cap against the pipe clutch. Additionally, the screw cap is provided with a packing ring 9 made from a heat-resistant material and which is secured thereto by means of washer 10 and bolts 11. The screw cap is connected with a valve 12 which is lodged in the branch pipe, by means of rods 13 passed through the coupling 2, plank 14 (FIG. 2) and screws 15 (FIG. 1). The valve 12 is fashioned as a hollow sleeve 16 which is closed at one end (FIG. 1), and having holes 17 for permitting air to enter from the interior of the branch pipe 1 into the interior of the pipe 4 being vitrified. The hollow sleeve 16 has a packing washer 18 disposed thereon, and a connecting sliding block 19 (FIGS. 1,2) screwed inside thereof which is designed to connect the plank 14 with the sleeve. Nut 20 (FIG. 1) is screwed onto the branch pipe 1 so as to control the force of the spring 8.

The other end portion of the pipe branch is provided with swivel mechanism 21 designed to preclude twisting of flexible hose 22 during the course of displacement of the rotating device and pipe. This mechanism comprises two rows of balls 23 united by a separator 24 and a casing 25. Furthermore, the end portion of the swivel mechanism is provided with an adapter 26 to connect the device to the flexible nose 22 extending from the source of pressurized gas (not shown). To prevent the air from leaking out through an annular clearance at the point of coupling of the surfaces of the branch pipe 1 thickened end portion and the separator 24, a packing ring 28 is provided.

The parts of the device, which are subjected to the effects of a high temperature (350°–400° C) near the zone of the heating of the pipe being vitrified and the heated clutch 3, consisting of elements 2, 8, 11, 14, 15, 16, 19, as well as the end portion of the branch pipe 1 having the coupling 2 seated thereon, are made from a heat-resistant steel. Additionally, the spring 8 is protected by casing 29 which is made from a heat-resistant non-metallic material, such as asbestos cloth.

In order to connect the device to the pipe 4 being vitrified, the coupling 2 having the exterior thread portion is introduced into the clutch 3 connected with the pipe, by screwing it into the clutch 3 through 1.5–2 turns. As a result, the screw cap 7 by thrusting together with the packing ring 9, against the butt end of the clutch 3 is pressed by the coupling 2, and causes the movable hollow sleeve 16 of the valve to follow it. While being displaced relative to the pipe branch 1, the sleeve 16 communicates with the interiors of the pipe 4 being vitrified and the branch pipe 1 through the intermediary of the holes 17, thereby allowing the compressed air to pass from the pipe branch 1 into the pipe 4. Concurrently, under the action of the spring 8, the screw cap 7 is pressed against the butt end of the clutch 3 of the pipe being vitrified by means of its packing ring 9, thus providing for the hermetic sealing of the connection of the device with the pipe.

With the air pressure in the pipe 4 exceeding a preset value, the pressure, by overcoming the resistance force of the spring 8, presses the screw cap 7 from the butt end of the clutch 3, and the excessive air is vented to the atmosphere from the interior of the pipe through an annular clearance formed between the butt end of the clutch 3 and the screw cap 7. The air is let out into the atmosphere until the pressure in the pipe being vitrified is brought down to the preset value, i.e., down to 1.5–1.8 atm.

With the process of vitrification completed along the whole length of the pipe 4, the device is then disconnected from the pipe by unscrewing the coupling 2. Thereby, the screw cap 7, while displacing along the pipe branch 1 under the action of the spring 8, causes the hollow sleeve 16 connected therewith to follow it, as a result of which the holes 17 of the sleeve 16 slide into a guiding duct 30, in which the hollow sleeve 16 slides, thereby cutting off the supply of the air through the pipe branch 1 into the pipe 4.

The screw cap 7 and the sleeve 16 are moved until the packing washer 18 of the screw cap 7 thrusts against an annular projection 31 on the branch pipe, whereupon the device is removed from the end portion of the pipe.

What is claimed is:

1. A valve mechanism for supplying pressurized gas into a pipe during the process of vitrification thereof, said mechanism comprising; a branch pipe in coaxial alignment with said pipe and having a first end in proximate spaced relationship therewith and a second distal end connected to receive a quantity of pressurized gas; a coupling member being fixedly mounted on said branch pipe at said first end, said coupling member having an externally threaded peripheral outer surface; a sleeve having internally threaded portions extending between said coupling member and said vitrifying pipe, the internal threaded portions of said sleeve engaging respectively the externally threaded surface of said coupling member and a threaded end portion of said pipe so as to rigidly connect said pipe and said coupling member; a cap positioned on said branch pipe and being axially movable relative thereto, said cap having an end surface facing an end of said sleeve; an annular packing ring being mounted on said cap end surface; said branch pipe having an externally threaded portion; an axially adjustable nut engaging said externally threaded portion of said branch pipe; resilient spring means being interposed between said nut and said cap normally biasing the latter toward said sleeve so as to provide a hermetically sealed joint between the vitrifying pipe and said mechanism; a slide valve being positioned in said branch pipe adjacent the first end thereof; and connecting means rigidly interconnecting said slide valve and said spring-loaded cap so as to provide concurrent movement of said valve with said cap, said valve providing pressurized gas communicating flow therethrough between said supply of pressurized gas and said vitrifying pipe during the process of vitrification, and preventing flow of pressurized gas therethrough upon disconnection of said pipe and branch pipe responsive to movement of said spring-loaded cap.

2. A valve mechanism as claimed in claim 1, comprising pivot mechanism formed at the end of said branch pipe receiving said supply of pressurized gas, said pivot mechanism being adapted to permit relative rotation between said vitrifying pipe and connection to the supply of pressurized gas during the vitrification process.

3. A valve mechanism as claimed in claim 1, said coupling member having slots provided therein to prevent tacking of said coupling member to said sleeve during said vitrification process.

* * * * *